United States Patent [19]
Cleary

[11] 3,931,118
[45] Jan. 6, 1976

[54] AMINOALKANESULFONATE-MODIFIED POLYAMIDES

[75] Inventor: James W. Cleary, Bartlesville, Okla.

[73] Assignee: Phillips Petroleum Company, Bartlesville, Okla.

[22] Filed: Sept. 2, 1971

[21] Appl. No.: 177,427

[52] U.S. Cl............ 260/78 SC; 8/178 R; 260/78 R; 260/78 A; 260/78 L
[51] Int. Cl.² ......................................... C08G 69/48
[58] Field of Search ... 260/78 R, 78 A, 78 L, 78 SC

[56] References Cited
UNITED STATES PATENTS

| | | | |
|---|---|---|---|
| 3,142,662 | 7/1964 | Huffman | 260/78 R |
| 3,389,172 | 6/1968 | Burrows et al. | 260/78 R |

*Primary Examiner*—Harold D. Anderson

[57] ABSTRACT

Polycarbonamide compositions having improved acid dye-resistance and basic dyeability properties wherein the polycarbonamides contain, as an integral part of the polymer chain, recurring amide linkages and terminal sulfonate groups resulting from aminoalkanesulfonic acids and/or alkali metal salts thereof, as well as the process for producing the modified polyamide compositions.

9 Claims, No Drawings

AMINOALKANESULFONATE-MODIFIED POLYAMIDES

This invention relates to synthetic polycarbonamides having improved acid dye-resistance and basic dyeability properties.

Unmodified nylon is dyeable to a single color only and is almost exclusively dyed with acid dyes that are absorbed by amino groups of the nylon molecules. The application of basic dyes which are absorbed by carboxy groups of the nylon molecules results in colored nylon having unacceptable wash- and light-fastness properties. Nylon has been modified, however, to improve its dyeability by forming the nylon in the presence of monofunctional, monosulfonated compounds. The modified molecules serve a dual role. First, they provide sulfonate groups which can be activated to absorb basic dye under acid conditions without activation of the carboxy groups, thereby providing color of acceptable wash- and light-fastness; second, they impart acid dye-resistant properties to the nylon by forming salts with amine end groups of unmodified molecules, thereby rendering these amine groups no longer available to absorb acid dyes.

While the use of monosulfonated compounds for producing modified polycarbonamides having acid dye-resistance and basic dyeability properties is broadly known in the art, the specific sulfonates and the various manipulative steps employed herein for producing modified polyamides in order to achieve highly desirable results are not known to be suggested by the art.

In accordance with this invention, in the production of a polycarbonamide, herein referred to as polyamide, an aminoalkanesulfonic acid or alkali metal salt thereof is incorporated in the polymerization recipe to improve the dyeability of the polyamide with basic dyes. As used herein, alkane is intended to include cycloalkane. Further, the term "sulfonate-modified polyamides" is inclusive of polyamides prepared through the use of aminoalkanesulfonic acids and/or the alkali metal salts thereof, and is comprised of free sulfonic acid and/or monoalkali metal sulfonate groups.

It is therefore an object of the present invention to provide modified polyamides having sufficient affinity for basic dyestuffs to provide modified nylon possessing all the characteristics essential for use in manufacturing fabrics, sheet materials, films, molded articles, and the like. Other objects will become apparent from the description which follows.

These objects are obtained by the polyamides of the present invention which comprise modified polyamides having improved acid dye-resistance and basic dyeability properties wherein said polyamides contain, as an integral part of the polymer chain, recurring amide linkages and terminal sulfonic acid and/or alkali metal sulfonate groups resulting from aminoalkanesulfonic acids and/or alkali metal salts thereof.

Suitable aminoalkanesulfonic acids and alkali metal salts thereof can be represented by the formula $RNHR'SO_3M$, where M is hydrogen or an alkali metal, R is hydrogen or a monovalent saturated hydrocarbon radical having 1–12 carbon atoms, and R' is a divalent saturated hydrocarbon radical having 1–18 carbon atoms, preferably 2–6 carbon atoms. Examples of some applicable aminoalkanesulfonic acids and alkali metal salts thereof include lithium aminomethanesulfonate, sodium 2-aminoethanesulfonate (sodium salt of taurine), sodium 2-(methylamino)ethanesulfonate (sodium salt of N-methyltaurine), 3-aminopropanesulfonic acid, sodium 3-aminopropanesulfonate, 4-(ethylamino)-2-methylbutanesulfonic acid, potassium 6-(isobutylamino)hexanesulfonate, rubidium 8-(cyclohexylamino)-2-ethyloctanesulfonate, 18-(dodecylamino)octadecanesulfonic acid, cesium 12-(hexylamino)dodecanesulfonate, 5-(3-methylcyclopentylamino)pentanesulfonic acid, lithium 2-[(cyclopentylmethyl)amino]ethanesulfonate, sodium 4-aminocyclohexanesulfonate, 2-methyl-3-aminocyclopentanesulfonic acid, potassium 4-(aminomethyl)cyclohexylmethanesulfonate, sodium 2-amino-2-cyclohexylethanesulfonate, and the like, and mixtures thereof.

According to the invention, a polycarbonamide composition having improved acid dye-resistance with basic dyeability properties wherein recurring amide linkages and terminal sulfonate groups are integral parts of a polymer chain is comprised of a polymerization product obtained from reactants comprising polyamide-forming compositions selected from the group consisting of amino acids, lactams, dicarboxylic acids and diamines, and salts of dicarboxylic acids and diamines, and at least one of an aminoalkanesulfonic acid and alkali metal salt thereof having the formula $RNHR'SO_3M$ wherein M is hydrogen or an alkali metal, R is hydrogen or a monovalent saturated hydrocarbon radical having 1–12 carbon atoms per radical, R' is a divalent saturated hydrocarbon having 1–18 carbon atoms per radical. The polycarbonamide can be formed by polymerizing in the presence of aminoalkanesulfonic acids or alkali metals salts thereof, for example, a polyamide-forming composition selected from the group consisting of (a) substantially equal molar proportions of a dicarboxylic acid having the formula $HO_2CR''CO_2H$ and a diamine having the formula $H_2NR''NH_2$, wherein each R'' having about 2 to about 18 carbon atoms per radical, and (b) an aminocarboxylic acid having the formula $H_2NR''CO_2H$, wherein R'' is as defined above.

The nature of R'' in the dicarboxylic acid, the diamine, or the amino acid is not critical. Preferably, it is a divalent hydrocarbon radical containing about 2–18 carbon atoms. Typical dicarboxylic acids which can be used include succinic acid, glutaric acid, adipic acid, 2-methyladipic acid, pimelic acid, suberic acid, azelaic acid, sebacic acid, undecanedioic acid, dodecanedioic acid, tetradecanedioic acid, octadecanedioic acid, eicosanedioic acid, p-phenylenediacetic acid, isophthalic acid, terephthalic acid, hexahydroterephthalic acid, and the like, and mixtures thereof. Typical diamines which can be used include ethylenediamine, propylenediamine, tetramethylenediamine, pentamethylenediamine, hexamethylenediamine, octamethylenediamine, nonamethylenediamine, 5-methylnonamethylenediamine, decamethylenediamine, dodecamethylenediamine, octadecamethylenediamine, p-phenylenediamine, p-xylylenediamine, 1,4-cyclohexanediamine, 1,4-bis(aminomethyl)cyclohexane, bis(4-aminocyclohexyl)methane, and the like, and mixtures thereof. If desired, the diamine can be employed as a salt of the dicarboxylic acid, e.g., nylon 6—6 salt from hexamethylenediamine and adipic acid. Typical amino acids which can be used include 3-aminopropionic acid, 6-aminocaproic acid, 4-ethyl-6-aminohexanoic acid, 9-aminononanoic acid, 12-aminododecanoic acid, 19-aminononadecanoic acid, 4-aminocyclohexanecarboxylic acid, 4-(aminomethyl)-cyclohexanecarboxylic acid, 4-(aminomethyl)benzoic acid, and the like, and mixtures thereof. If desired, derivatives of these monomers known to be useful in the production of polyamides can be used in place of the above monomers. As examples, a corresponding ester or acid halide can be used in place of a dibasic acid, and the corresponding lactam can be employed instead of an amino acid.

In the production of the polyamides of this invention, the polyamide-forming monomer(s) are polymerized in the presence of at least one of the above described aminoalkanesulfonic acids and alkali metal salts thereof, said aminoalkanesulfonic acid or alkali metal salt thereof being present in an amount of 0.05–4, preferably 0.1–2, mole per cent, based on the moles of recurring units in the polyamide product. For illustrative purposes, each mole of recurring units in the polymer product can, for example, result from one mole of an amino acid, from one mole of a lactam, from one mole of each of a dicarboxylic acid and a diamine, or from the salt from one mole of a dicarboxylic acid and one mole of a diamine. When a dicarboxylic acid and a diamine are used, or when the corresponding salt is used, it is preferable to have present a slight excess of the dicarboxylic acid to keep relatively low the concentration of amine groups in the polymer and to provide carboxyl groups in the growing polymer chain for reaction with the aminoalkanesulfonic acid or alkali metal salt thereof. When it is desired that an alkali metal salt of an aminoalkanesulfonic acid be used, the salt can be employed directly as such, or it can be produced in the polymerization reactor, e.g., by reaction of the free aminoalkanesulfonic acid with an alkali metal hydroxide.

The polyamides of this invention are prepared through the use of procedures well known in the art. Thus, the reactants are heated at a temperature of from about 360°–620°F., preferably about 400°–600°F., until the resulting polymer has a sufficiently high molecular weight, e.g., as indicated by an intrinsic viscosity of at least 0.4 if it is desirable that the polymer exhibit fiber-forming properties. The reaction can be conducted at superatmospheric, atmospheric, or subatmospheric pressure. Often it is desirable, especially in the last stage of the polymerization, to employ conditions, e.g., reduced pressure, which will aid in the removal of reaction by-products. If desired, the polymerization can be conducted in the presence of additives such as pigments and light stabilizers.

Although the sulfonate-modified polyamides of this invention are particularly useful in the preparation of fibers, they are also of value in the production of sheet materials, films, molded articles, and the like. These sulfonate-modified polyamides can constitute substantially all of the polymer in compositions so used, or they can represent one component of a blend of polymers, such as in a blend with polypropylene or other polyolefin or other polymer having insufficient affinity for basic dyes.

EXAMPLE I

To prepare a modified polyamide through use of the sodium salt of N-methyltaurine in an amount of 1.0 mole percent based on nylon 6—6 salt employed, a mixture of 1150 g of an aqueous solution of 524 g (2.00 moles) of nylon 6—6 salt, 4.96 g (0.020 mole) of the sodium salt of N-methyltaurine as a 65 weight percent aqueous solution, 2,920 g (0.020 mole) of adipic acid, and 1 ml of Dow Corning Antifoam C composition was heated in an autoclave at about 450°–540°F. for approximately 3 hours, during which time steam was vented under a pressure which declined from about 340 psig initially to a final pressure of about 16 inches Hg absolute. The resulting white polyamide had an inherent viscosity (at 30°C. in m-cresol, 0.5 weight percent concentration) of 0.85 and a sulfur content of 0.20 weight percent, with 38 microequivalents of amine groups and 93 microequivalents of acid groups per gram of polymer.

EXAMPLE II

To prepare a modified polyamide through use of sodium 3-aminopropanesulfonate in an amount of 1.5 mole percent based on nylon 6—6 salt employed, a mixture of 1115 g of an aqueous solution of 524 g (2.00 moles) of nylon 6—6 salt, 4.17 g (0.030 mole) of 3-aminopropanesulfonic acid, 2.92 g (0.020 mole) of adipic acid, 30 ml of 1.0 N sodium hydroxide (0.030 equivalent), and 1 ml of Dow Corning Antifoam C composition was heated in an autoclave at about 450°–540°F. for approximately 3 hours, during which time steam was vented under a pressure which declined from about 320 psig initially to a final pressure of about 17 inches Hg absolute. The resulting white polyamide had an inherent viscosity (at 30°C. in m-cresol, 0.5 weight percent concentration) of 0.92 and a sulfur content of 0.20 weight percent, with 38 microequivalents of amine groups and 80 microequivalents of acid groups per gram of polymer.

EXAMPLE III

To prepare a modified polyamide through use of 3-aminopropanesulfonic acid, as the free acid, in an amount of 1.0 mole percent based on nylon 6—6 salt employed, a mixture of 1135 g of an aqueous solution of 524 g (2.00 moles) of nylon 6—6 salt, 2.794 g (0.020 mole) of 3-aminopropanesulfonic acid, 2.92 g (0.020 mole) of adipic acid, 0.0214 g of manganese lactate light stabilizer, 0.452 g of titanium dioxide, 1 ml of Dow Corning Antifoam C composition, and 10 ml of water was heated in an autoclave at about 440°–535°F. for approximately 3 hours, during which time steam was vented under a pressure which declined from about 310 psig initially to a final pressure of about 22 inches Hg absolute. The resulting nearly white polyamide had an inherent viscosity (at 30°C. in m-cresol, 0.5 weight percent concentration) of 0.88 and a sulfur content of 0.15 weight percent, with less than 6 microequivalents of amine groups and with 155 microequivalents of acid groups per gram of polymer.

EXAMPLE IV

In a control run employing no sulfonic acid or salt thereof, a modified polyamide outside the scope of this invention was prepared by heating a mixture of 1235 g of an aqueous solution of 524 g (2.00 moles) of nylon 6—6 salt, 2.920 g (0.020 mole) of adipic acid, and 1 ml of Dow Corning Antifoam C composition in an autoclave at about 440°–540°F. for approximately 3½ hours, during which time steam was vented under a pressure which declined from about 340 psig initially to a final pressure of about 14 inches Hg absolute. The resulting polyamide had an inherent viscosity (at 30°C in m-cresol, 0.5 weight percent concentration) of 1.14, with 20 microequivalents of amine groups and 114 microequivalents of acid groups per gram of polymer.

EXAMPLE V

In a control run employing no sulfonic acid or salt thereof, a modified polyamide outside the scope of this invention was prepared by heating a mixture of 1151 g. of an aqueous solution of 524 g. (2.00 moles) of nylon 6—6 salt, 1.20 g. (0.020 mole) of acetic acid, and 1 ml. of Dow Corning Antifoam C composition in an autoclave at about 450°–540°F for approximately 3 hours, during which time steam was vented under a pressure which declined from about 340 psig initially to a final pressure of about 19 inches Hg absolute. The resulting polyamide had an inherent viscosity (at 30°C in m-cresol, 0.5 weight percent concentration) of 1.01, with 20 microequivalents of amine groups and 75 microequivalents of acid groups per gram of polymer.

The modified polyamide products of Examples I, II, IV, and V were evaluated by spinning and drawing into fibers having a denier of about 180/12, followed by determination of basic dyeability and resistance to an acid dye. The basic dye uptake (BDU) was determined using Sevron Blue 2G dye, and the results were expressed as microequivalents of dye absorbed per gram of fiber. Staining by an acid dye was determined in competitive dyeing with deep dyeable Rhodiaceta nylon using Acid Light Scarlet GL by visually observing the extent of staining. The results are summarized in the following table.

| Source of Modified Polyamide | BDU, Microequivalents of Dye/Gram Fiber | Acid Dye Staining |
|---|---|---|
| Example I | 28.5 | None |
| Example II | 28.4 | None |
| Example IV | 17.1 | None |
| Example V | 14.0 | Stained |

The above table shows that the modified polymers of Examples I and II, both within the scope of the invention, possessed greated dyeability with the basic dye than did the modified polyamide of Examples IV and V which were control polymers outside the scope of the invention. The modified polyamides were not stained by the acid dye.

Since many departures from the specifically exemplified embodiments disclosed herein may be made which are within the spirit and scope of the invention, limitations are to be regarded only as set out in the claims which follow.

What I claim is:

1. A fiber-forming aliphatic polycarbonamide wherein recurring amide linkages and terminal sulfonate groups are integral parts of a polymer chain which consists essentially of a polymerization product obtained from reactants consisting essentially of (A) at least one polyamide-forming component selected from the group consisting of amino acid, lactam, dicarboxylic acid and diamine, and salt of dicarboxylic acid and diamine, and (B) at least one basic dyeability modifier selected from the group consisting of aminoalkanesulfonic acid and alkali metal salt thereof having the formula $RNHR'SO_3M$ wherein M is hydrogen or an alkali metal, R is hydrogen or a monovalent saturated hydrocarbon radical having 1–12 carbon atoms per radical, R' is a divalent saturated hydrocarbon radical having 1–18 carbon atoms per radical; said basic dyeability modifier being present therein in an amount of from about 0.05 to about 4 mol percent based on the mols of recurring amide units in the polycarbonamide.

2. A fiber-forming polycarbonamide according to claim 1 wherein R' is a divalent saturated hydrocarbon radical having from 2–6 carbon atoms per radical.

3. A fiber-forming polycarbonamide according to claim 1 wherein reactant (A) is the salt of (a) at least one dicarboxylic acid having the formula $HO_2CR'''CO_2H$ and (b) at least one diamine having the formula $H_2NR''NH_2$, wherein R'' is a divalent hydrocarbon radical having from about 2 to about 18 carbon atoms per radical.

4. A fiber-forming polycarbonamide according to claim 1 wherein reactant (A) is at least one aminocarboxylic acid having a formula $H_2NR''CO_2H$, wherein R'' is a divalent hydrocarbon radical having from about 2 to about 18 carbon atoms per radical.

5. A fiber-forming polycarbonamide according to claim 1 wherein said modifier is present in an amount of from about 0.1 to about 2 mol percent based on the mols of recurring amide units in the polycarbonamide.

6. A fiber-forming polycarbonamide according to claim 1 wherein said modifier is selected from the group consisting of 18-(dodecylamino)octadecanesulfonic acid, 5-(3-methylcyclopentylamino)pentanesulfonic acid, 3-aminopropanesulfonic acid, 2-methyl-3-aminocyclopentanesulfonic acid, lithium aminomethanesulfonate, sodium 2-aminoethanesulfonate, sodium 2-(methylamino)ethanesulfonate, sodium 3-aminopropanesulfonate, potassium 6-(isobutylamino)-hexanesulfonate, rubidium 8-(cyclohexylamino)-2-ethyloctanesulfonate, cesium 12-(hexylamino)dodecanesulfonate, lithium 2-[(cyclopentylmethyl)amino]ethanesulfonate, sodium N-methyltaurine, sodium 4-aminocyclohexanesulfonate, potassium 4-(aminomethyl)cyclohexylmethanesulfonate, and sodium 2-amino-2-cyclohexylethanesulfonate.

7. A fiber-forming polycarbonamide according to claim 1 wherein said modifier is 3-aminopropanesulfonic acid.

8. A fiber-forming polycarbonamide according to claim 1 wherein said modifier is sodium 3-aminopropanesulfonate.

9. A fiber-forming polycarbonamide according to claim 1 wherein said modifier is sodium N-methyltaurine.

* * * * *